N. JONES.
Car Axle.

No. 201,881. Patented April 2, 1878.

Witnesses:
P. C. Dietrich
Frank H. Duffy

Inventor:
Nathaniel Jones.
Per C. H. Watson & Co. Attorneys.

UNITED STATES PATENT OFFICE.

NATHANIEL JONES, OF SYRACUSE, NEW YORK.

IMPROVEMENT IN CAR-AXLES.

Specification forming part of Letters Patent No. 201,881, dated April 2, 1878; application filed March 18, 1878.

*To all whom it may concern:*

Be it known that I, NATHANIEL JONES, of Syracuse, in the county of Onondaga and State of New York, have invented certain new and useful Improvements in Car-Axles; and I do hereby declare that the following is a full, clear, and exact description thereof, which will enable others skilled in the art to which they appertain to make and use the same, reference being had to the accompanying drawings, and to the letters of reference marked thereon, which form a part of this specification.

This invention relates to car-axles, having for its object to improve the construction of the same and provide an axle in which the car-wheels upon either side can turn independently of each other, whereby the friction is reduced in going around curves; and it consists in a solid axle, having suitable bearings or journals at each end, and having one wheel secured thereto, and a hollow axle or sleeve, to which the opposite wheel is secured, and in which the solid axle is placed and provided with means for fastening, as will be hereinafter more fully described.

Figure 1:
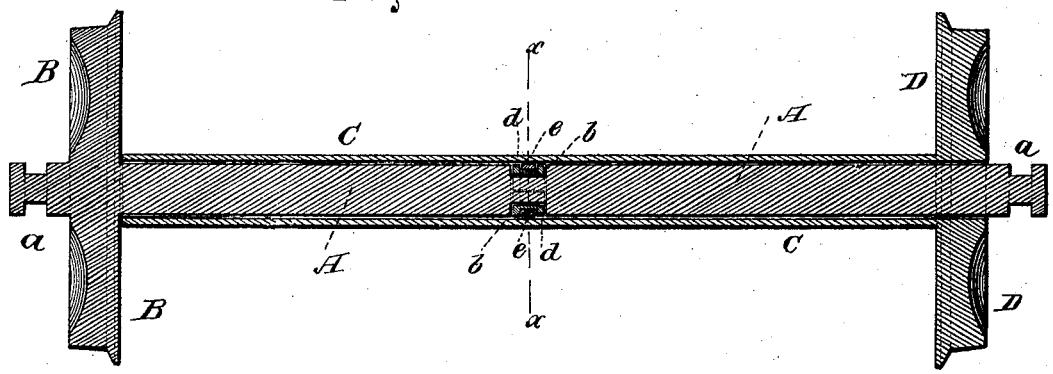
Figure 2:
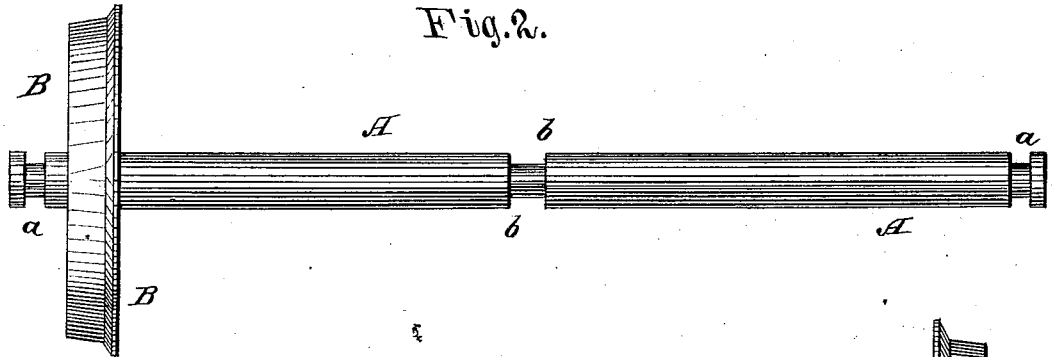
Figure 3:
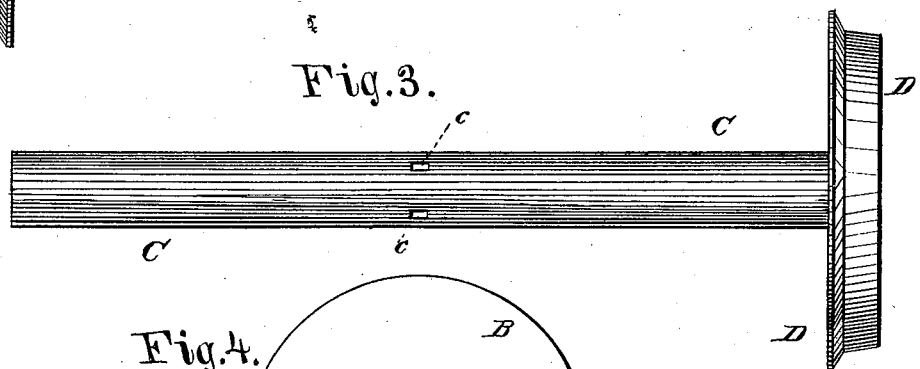
Figure 4:
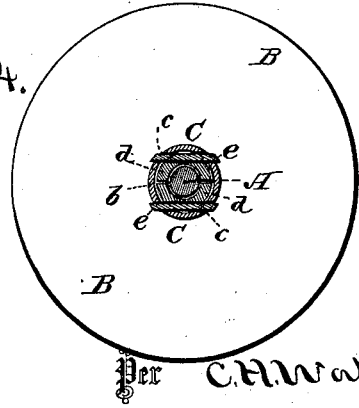

In the annexed drawing, Figure 1 represents a longitudinal section; Fig. 2, the solid axle with journals or bearings upon each end, and one wheel attached thereto; Fig. 3, the hollow axle and another wheel attached. Fig. 4 is a transverse section on line $x\ x$, Fig. 1.

A represents the solid axle, which is provided with journals or bearings $a\ a$ at each end, and near one end the axle has secured thereto, in any suitable manner, the wheel B.

C represents the hollow axle, being provided near one end with the wheel D, which is secured thereto in any desired manner, and when the axles are put together, as shown in Fig. 1, the hollow axle C slips over the solid axle A, and the journals or bearings $a\ a$ of the solid axle extend beyond the wheels B and D, as shown.

The solid axle A is provided with a recess or groove, $b$, in which a collar, $d$, is placed. This collar is formed with openings or grooves to receive keys or pins $e$, which pass through the openings or perforations $c$ in the hollow axle C, thus firmly securing the axles together, so that there is no lateral motion between them, and no strain upon the keys or pins, as all the strain comes upon the collar $d$, the key or keys serving simply to lock or hold the collar in place.

The collar is represented as being made in two pieces; but it may be made in one piece, if so desired, and may extend but partially around the axle; and there need be but one key or pin used where the collar is in one piece; and upon the solid axle the number of collars and keys may be increased or decreased, as may be desired, in securing the two axles together.

It will thus appear that a simple, cheap, and effective means is provided for securing the axles together, while the wheels are allowed to revolve independently of each other.

Having thus fully described the invention, what is claimed, and desired to be secured by Letters Patent, is—

1. The solid axle A, having groove or recess $b$, in combination with a hollow axle provided with an opening or openings, $c$, and a collar and pin or pins, substantially as and for the purpose set forth.

2. The solid axle A, having journals or bearings $a\ a$, groove or recess $b$, and the wheel B, in combination with the hollow axle C, provided with the wheel D and openings $c$, and a collar and means for locking the parts, as and for the purpose herein set forth.

In testimony that I claim the foregoing as my own I have hereto affixed my signature in presence of two witnesses.

NATHANIEL JONES.

Witnesses:
C. H. WATSON,
G. H. BOUTON.